United States Patent
Kim et al.

(10) Patent No.: US 8,944,624 B2
(45) Date of Patent: Feb. 3, 2015

(54) ILLUMINATION UNIT AND DISPLAY APPARATUS USING THE SAME

(71) Applicant: LG Innotek Co., Ltd., Seoul (KR)

(72) Inventors: Moon Jeong Kim, Seoul (KR); Duk Hyun Yun, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 72 days.

(21) Appl. No.: 13/774,277

(22) Filed: Feb. 22, 2013

(65) Prior Publication Data

US 2013/0223066 A1     Aug. 29, 2013

(30) Foreign Application Priority Data

Feb. 23, 2012 (KR) .................. 10-2012-0018485

(51) Int. Cl.
    *G09F 13/04*        (2006.01)
    *F21V 13/12*        (2006.01)
    *G02F 1/1335*      (2006.01)

(52) U.S. Cl.
    CPC .......... *F21V 13/12* (2013.01); *G02F 1/133608* (2013.01); *G02F 1/133615* (2013.01)
    USPC ................ 362/97.2; 362/249.02; 362/249.11; 362/298; 362/561

(58) Field of Classification Search
    CPC .............. G02B 17/06; G02F 1/133602; G02F 1/133603; G02F 1/133605; G02F 1/133606; G02F 1/133608; G09F 13/00; G09F 13/14; F21V 5/002; F21V 7/0008; F21V 7/0025; F21V 13/04
    USPC ............... 362/84, 97.1–97.4, 217.01, 217.02, 362/217.04, 217.05, 223, 225, 235, 236, 362/240, 241, 249.02, 249.05, 244–247, 362/297–300, 311.01, 311.02, 346, 347, 362/350, 516–518, 544–546, 561
    See application file for complete search history.

(56) References Cited

U.S. PATENT DOCUMENTS

| | | | | |
|---|---|---|---|---|
| 5,136,483 | A * | 8/1992 | Schoniger et al. | 362/545 |
| 6,234,646 | B1 * | 5/2001 | Ito | 362/235 |
| 6,238,073 | B1 * | 5/2001 | Ito et al. | 362/544 |
| 7,229,198 | B2 * | 6/2007 | Sakai et al. | 362/560 |
| 7,255,459 | B2 * | 8/2007 | Kuan et al. | 362/247 |
| 8,235,540 | B2 * | 8/2012 | Park et al. | 362/97.1 |
| 8,523,389 | B2 * | 9/2013 | Holten et al. | 362/246 |

(Continued)

FOREIGN PATENT DOCUMENTS

| | | |
|---|---|---|
| EP | 1 950 603 A1 | 7/2008 |
| EP | 2 149 740 A | 2/2010 |
| WO | WO 2007/125622 A1 | 11/2007 |

*Primary Examiner* — Hargobind S Sawhney
(74) *Attorney, Agent, or Firm* — Birch, Stewart, Kolasch & Birch, LLP

(57) ABSTRACT

Disclosed herein are an illumination unit and a display apparatus. The illumination unit includes a first reflector, a second reflector arranged at either side of the first reflector, at least one light source module arranged between the first reflector and the second reflector, a cover member for covering the second reflector, an optical member arranged between the cover member and the second reflector while facing the first reflector, a first projection member interposed between the optical member and the cover member, and a second projection member interposed between the optical member and the second reflector. The distance from the cover member to one side surface of the first projection member is longer than the distance from the cover member to one side surface of the second projection member.

20 Claims, 21 Drawing Sheets

(56) References Cited

U.S. PATENT DOCUMENTS

| | | | |
|---|---|---|---|
| 8,556,442 B2 * | 10/2013 | Jang et al. | 362/97.1 |
| 8,616,754 B2 * | 12/2013 | Ko et al. | 362/623 |
| 2006/0274550 A1 * | 12/2006 | Liu et al. | 362/611 |
| 2007/0014126 A1 * | 1/2007 | Kuo et al. | 362/600 |
| 2009/0073338 A1 | 3/2009 | Jeong | |
| 2011/0222267 A1 | 9/2011 | Park et al. | |

* cited by examiner

Light

ILLUMINATION UNIT AND DISPLAY APPARATUS USING THE SAME

CROSS REFERENCE TO RELATED APPLICATION

This application claims priority under 35 U.S.C. §119 to Korean Application No. 10-2012-0018485, filed in Korea on Feb. 23, 2012 which is hereby incorporated in its entirety by reference as if fully set forth herein.

FIELD

Embodiments relate to an illumination unit and a display apparatus using the same.

BACKGROUND

Generally, a downlight is an illumination system in which a light source is built in a hole perforated through a ceiling. This system is widely used for architectural illumination to provide illumination integrated with a building.

Since such a downlight is recessed in a ceiling, there is little or no exposure of the elements of the downlight. In this regard, there may be an advantage in that the ceiling has a smart appearance. Furthermore, such a downlight may be a system suitable for creation of a relaxed room atmosphere in that the ceiling is dark.

However, such an illumination system may be more suitable for a narrow indoor space than a wide indoor space. Furthermore, this system may require a number of LED light sources.

To this end, it may be necessary to develop an illumination unit suitable for a wide indoor space while employing a reduced number of LED light sources.

SUMMARY

In accordance with an embodiment, there is provided an illumination unit capable of eliminating or reducing downward bending of an optical member by arranging protrusion members at end portions of the optical member, and a display apparatus using the same.

In accordance with another embodiment, there is provided an illumination unit, which employs reflectors each partially having an inclined surface, thereby being suitable for a wide indoor space, and a display apparatus using the same.

Additional advantages, objects, and features of the embodiments will be set forth in part in the description which follows and in part will become apparent to those having ordinary skill in the art upon examination of the following or may be learned from practice of the invention. The objectives and other advantages of the embodiments may be realized and attained by the structure particularly pointed out in the written description and claims hereof as well as the appended drawings.

To achieve the objects and other advantages and in accordance with the embodiments, as broadly described herein, an illumination unit includes a first reflector, a second reflector arranged at either side of the first reflector, at least one light source module arranged between the first reflector and the second reflector, a cover member for covering the second reflector, an optical member arranged between the cover member and the second reflector while facing the first reflector, a first projection member interposed between the optical member and the cover member, and a second projection member interposed between the optical member and the second reflector, wherein a distance from the cover member to one side surface of the first projection member is longer than a distance from the cover member to one side surface of the second projection member.

The first and second projection members may be misaligned with each other.

The first projection member and the second projection member may partially overlap with each other. The first projection member and the second projection member may be spaced apart from each other without overlapping with each other.

The side surface of the first projection member and the side surface of the second projection member may be spaced apart from each other by a distance different from a thickness of the optical member.

The second projection member may haves a greater thickness than the first projection member.

At least one of the first and second projection members may have a greater thickness than the optical member.

The second projection member may have a longer length than the first projection member.

The first projection member may be made of a material identical to a material of the optical member, and the first projection member and the optical member may be integrated to form a single body. Alternatively, the first projection member may be made of a material identical to a material of the cover member, and the first projection member and the cover member may be integrated to form a single body.

The second projection member may be made of a material different from a material of the optical member or a material of the cover member, and the first projection member may be separate from the optical member or the cover member.

The second projection member may be made of a material identical to a material of the optical member, and the second projection member and the optical member may be integrated to form a single body.

The first projection member may include a first surface facing the cover member, and a second surface facing optical member. The second projection member may include a third surface facing the optical member, and a fourth surface facing the second reflector. One of a bonding member, a buffering member and a fastening member may be disposed on at least one of the first, second, third and fourth surfaces.

The optical member may include at lest one groove formed at a region facing the first projection member or the second projection member.

One of a bonding member, a buffering member and a fastening member may be disposed in the groove.

The groove has a smaller area than the first projection member or the second projection member.

The first reflector may not be parallel with the optical member, and the second reflector may be parallel with the optical member.

The first reflector may include at least two inclined surfaces having at least one inflection point.

The first reflector may include first and second inclined surfaces arranged adjacent to each other at opposite sides of an inflection point, and the first and second inclined surfaces may have different radii of curvature.

The first inclined surface may be arranged adjacent to the second light source module, and the radius of curvature of the first inclined surface may be smaller than the radius of curvature of the second inclined surface.

In another embodiment, an illumination unit includes a first reflector, a second reflector arranged at either side of the first reflector, at least one light source module arranged between the first reflector and the second reflector, a cover member for covering the second reflector, and an optical member arranged between the cover member and the second reflector while facing the first reflector, wherein the optical member includes a central region, and a peripheral region surrounding the central region, and wherein the peripheral region of the optical member has a greater weight than a weight of the central region of the optical member.

The weight of the peripheral region of the optical member may be about 0.1 to 10 times greater than the weight of the central region of the optical member.

The optical member may include a first projection member arranged at a side of the peripheral region facing the cover member, and a second projection member arranged at a side of the peripheral region facing the second reflector.

The first projection member may be arranged adjacent to the central region of the optical member, and the second projection member may be arranged adjacent to an end of the optical member.

The first and second projection members may be misaligned with each other.

It is to be understood that both the foregoing general description and the following detailed description of the embodiments are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein.

DETAILED DESCRIPTION

Reference will now be made in detail to the preferred embodiments, examples of which are illustrated in the accompanying drawings.

In the following description of the embodiments, it will be understood that, when an element such as a layer (film), region, pattern, or structure is referred to as being "on" or "under" another element, it can be "directly" on or under another element or can be "indirectly" formed such that an intervening element is also present. Also, terms such as "on" or "under" should be understood on the basis of the drawings.

Furthermore, the expression "on" or "under" may be used herein to represent the relationship of one element to another element as illustrated in the figures. It will be understood that this expression is intended to encompass different orientations of the elements in addition to the orientation depicted in the figures, namely, to encompass both "on" and "under".

Figure 1:
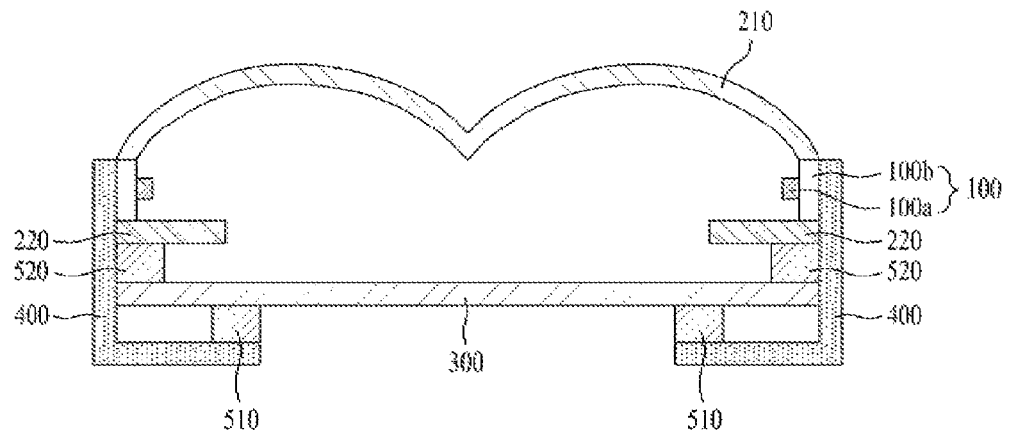
FIG. 1 is a sectional view explaining an illumination unit according to an embodiment.

FIG. 1 is a sectional view explaining an illumination unit according to an embodiment.

As shown in FIG. 1, the illumination unit may include light source modules 100, first and second reflectors 210 and 220, an optical member 300, a cover member 400, and first and second projection members 510 and 520. The illumination unit substantially has a laterally symmetrical structure in which the light source modules 100 are arranged at opposite sides of the illumination unit. Accordingly, for convenience of description, the following description will be given only in conjunction with one side of the illumination unit where one light source module 100 is arranged.

The light source module 100 may be interposed between the first reflector 210 and the second reflector 220 while being disposed adjacent to the second reflector 220.

If necessary, the light source module 100 may be in contact with the second reflector 220 while being spaced apart from the first reflector 210 by a predetermined distance. Alternatively, the light source module 100 may be in contact with the first reflector 210 while being spaced apart from the second reflector 220 by a predetermined distance.

Also, the light source module 100 may be spaced apart from both the first and second reflectors 210 and 220 by a predetermined distance or may be in contact with both the first and second reflectors 210 and 220.

The light source module 100 may include a circuit board 100b having an electrode pattern, and at least one light source 100a arranged on the circuit board 100b.

The light source 100a of the light source module 100 may be a top view type light emitting diode.

If necessary, the light source 100a may be a side view type light emitting diode.

The circuit board 100b may be a printed circuit board (PCB) made of a material selected from polyethylene terephthalate (PET), glass, polycarbonate (PC) and silicon (Si). Alternatively, the circuit board 100b may take the form of a film.

The circuit board 100b may be selected from among a single-layer PCB, a multi-layer PCB, a ceramic board, a metal core PCB, and the like.

A reflective coating film or a reflective coating material may be formed over the circuit board 100b, to reflect light emitted from the light source 100a toward a central region of the second reflector 220.

The light source 100a may be a light emitting diode (LED) chip. The LED chip may be a blue LED chip or ultraviolet LED chip, or may be a package combining at least one or more of a red LED chip, a green LED chip, a blue LED chip, a yellow green LED chip and a white LED chip.

A white LED may be realized by coupling a yellow phosphor to a blue LED, or by coupling both a red phosphor and a green phosphor to a blue LED. Alternatively, the white LED may be realized by coupling a yellow phosphor, a red phosphor and green phosphor to a blue LED.

The first reflector 210 and second reflector 220 may face each other while being spaced apart from each other by a predetermined distance, to form an air guide region in an empty space between the first reflector 210 and the second reflector 220.

Each of the first and second reflectors 210 and 220 may include a metal or a metal oxide, which has high reflectance, such as aluminum (Al), silver (Ag), gold (Au), or titanium dioxide ($TiO_2$).

If necessary, each of the first and second reflectors 210 and 220 may be formed by bonding a reflection film or a reflection sheet to a polymer resin frame.

Alternatively, each of the first and second reflectors 210 and 220 may be formed by depositing or coating metal or metal oxide over a polymer resin frame or printing a metal ink on the polymer resin frame.

The first and second reflectors 210 and 220 may be made of the same material. If necessary, the first and second reflectors 210 and 220 may be made of different materials, respectively.

Each of the first and second reflectors 210 and 220 may be formed, at a portion of a surface thereof, with sawtooth-shaped reflection patterns.

The surface of each reflection pattern may be a flat surface or a curved surface.

Each of the first and second reflectors 210 and 220 may have, at a portion thereof, an inclined surface.

If necessary, the second reflector 220 may have a flat surface, whereas the first reflector 210 may have an inclined surface at a portion thereof.

In this case, the first reflector 210 may have at least two inclined surfaces having at least one inflection point.

The inclined surface of the first reflector 210 may be an inclined surface having an inclination of a predetermined angle with respect to a surface of the second reflector 220. The inclined surface may include at least one of a concave surface, a convex surface and a flat surface.

If necessary, the first reflector 210 may have at least one inclined surface and at least one flat surface. The flat surface of the first reflector 210 may be parallel with the surface of the second reflector 220.

The flat surface of the first reflector 210 may overlap with a portion of the light source module 100.

Alternatively, the first reflector 210 may have at least two inclined surfaces having at least one inflection point. Two inclined surfaces arranged adjacent to each other at opposite sides of one inflection point, namely, first and second inclined surfaces, may have different curvatures.

Meanwhile, an optical member 300 may be disposed to be spaced apart from the first reflector 210 by a predetermined distance and thus to form a space therebetween.

Thus, an air guide region may be formed between the space between the first reflector 210 and the optical member 300.

The optical member 300 may have a projection/groove pattern formed at an upper surface of the optical member 300.

The optical member 300 functions to diffuse light emitted from the light source module 100. In order to enhance light diffusion effects, the optical member 300 may have a projection/groove pattern formed at an upper surface of the optical member 300.

The optical member 300 may have a multilayer structure having several layers. In this case, the projection/groove pattern may be formed at a surface of an uppermost one of the layers or a surface of one of the layers.

The projection/groove pattern may have a stripe shape extending along the light source module 100.

In this case, the projection/groove pattern may include projections protruded from the surface of optical member 300. Each projection has first and second facets facing each other. The facing first and second facets form an angle, which may be acute or obtuse.

If necessary, the optical member 300 may be formed using at least one sheet. In this case, the optical member 300 may selectively include a diffusion sheet, a prism sheet, a brightness enhancing sheet, etc.

The diffusion sheet diffuses light emitted from light sources. The prism sheet guides diffused light to a light emission region. The brightness enhancing sheet enhances brightness of light.

The cover member 400 may be arranged to cover the second reflector 220. Opposite end portions of the optical member 300 may be interposed between the cover member 400 and the second reflector 220.

The first projection member 510 may be interposed between the optical member 300 and the cover member 400. The second projection member 520 may be interposed between the optical member 300 and the second reflector 220.

In this case, the distance from the cover member 400 to one side surface of the first projection member 510 may be longer than the distance from the cover member 400 to one side surface of the second projection member 520.

The first projection member 510 may be arranged adjacent to a central region of the optical member 300, whereas the second projection member 520 may be arranged adjacent to the corresponding end portion of the optical member 300.

In accordance with the above-described arrangement, it may be possible to prevent the optical member 300 from being downwardly bent at the central region thereof.

For example, the first projection member 510 may function as a fulcrum to support the optical member 300. The second projection member 520 may function to downwardly press the corresponding end portion of the optical member 300 in order to prevent the optical member 300 from being downwardly bent at the central region thereof. Thus, it may be possible to avoid downward bending of the optical member 300.

Each of the first and second projection members 510 and 520 may be any one of a bonding member, a buffering member, and a fastening member.

If necessary, the first projection member 510 may be protruded from the cover member 400 or may be protruded from the optical member 300.

The second projection member 520 may be protruded from the second reflector 220 or may be protruded from the optical member 300.

In an embodiment, the optical member 300 may include a central region and a peripheral region surrounding the central region. The first and second projection members 510 and 520 may be protruded from the peripheral region of the optical member 300.

That is, the first and second projection members 510 and 520 may be made of the same material as that of the optical member 300 and may be protruded from the peripheral region of the optical member 300.

In this case, the weight of the peripheral region of the optical member 300 may be greater than the weight of the central region of the optical member 300 because the optical member 300 includes the first and second projection members 510 and 520 at the peripheral region.

For example, the weight of the peripheral region of the optical member 300 may be about 0.1 to 10 times greater than the weight of the central region of the optical member 300.

Since the optical member 300 includes the first projection member 510 arranged at a side of the peripheral region facing the cover member 400, and the second projection member 520 arranged at a side of the peripheral region facing the second reflector 220, it may be possible to prevent the optical member 300 from being downwardly bent at the central region thereof.

The first projection member 510 may be arranged adjacent to the central region of the optical member 300, whereas the second projection member 520 may be arranged adjacent to the corresponding end portion of the optical member 300.

Thus, the first projection member 510 and second projection member 520 may be arranged to be misaligned with each other.

Figure 2:
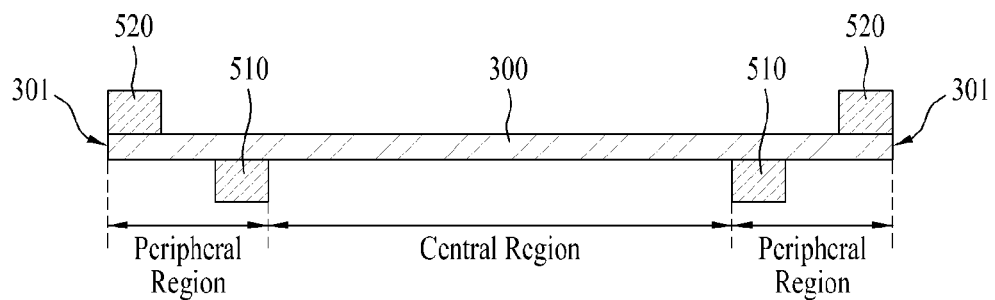
FIG. 2 is a sectional view illustrating arrangement of first and second projection members.

FIG. 2 is a sectional view illustrating arrangement of the first and second projection members.

As shown in FIG. 2, the optical member 300 may include a central region and a peripheral region surrounding the central region.

The first and second projection members 510 and 520 may be arranged at the peripheral region of the optical member 300. In this case, the first projection member 510 may be arranged adjacent to the central region of the optical member 300, whereas the second projection member 520 may be arranged adjacent to the corresponding end portion of the optical member 300.

Each of the first and second projection members 510 and 520 may be one of a bonding member, a buffering member, and a fastening member.

If necessary, the first and second projection members 510 and 520 may be protruded from the optical member 300.

That is, the first and second projection members 510 and 520 may be made of the same material as that of the optical member 300 and may be protruded from the peripheral region of the optical member 300.

In this case, the weight of the peripheral region of the optical member 300 may be greater than the weight of the central region of the optical member 300 because the optical member 300 includes the first and second projection members 510 and 520 at the peripheral region.

For example, the weight of the peripheral region of the optical member 300 may be about 0.1 to 10 times greater than the weight of the central region of the optical member 300.

Figure 3A:
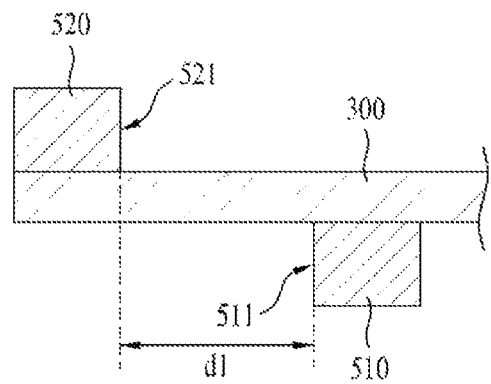
FIGS. 3A to 3C are sectional views illustrating arrangement relation between the first and second projection members.
Figure 3B:
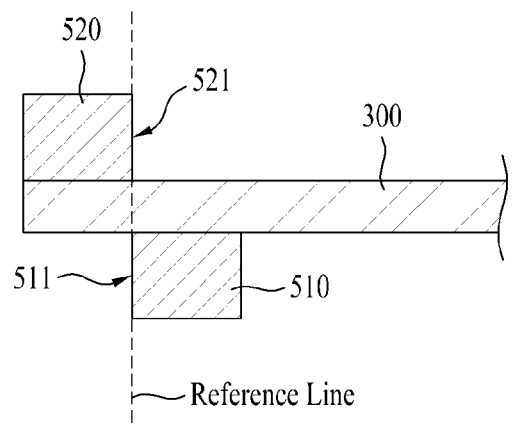
Figure 3C:
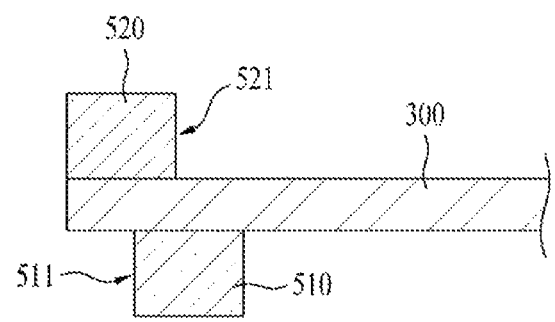

FIGS. 3A to 3C are sectional views illustrating arrangement relation between the first and second projection members.

As shown in FIGS. 3A to 3C, the first projection member 510 and second projection member 520 may be arranged to be misaligned with each other.

The first projection member 510 may be disposed at a lower surface of the optical member 300, whereas the second projection member 520 may be disposed at an upper surface of the optical member 300.

As shown in FIG. 3A, the first and second projection members 510 and 520 may be spaced apart from each other by a distance d1 corresponding to a spacing between adjacent side surfaces 511 and 521 thereof.

If necessary, as shown in FIG. 3B, the first and second projection members 510 and 520 may be arranged such that the adjacent side surfaces 511 and 521 thereof are aligned with each other along a reference line.

Alternatively, as shown in FIG. 3C, the first and second projection members 510 and 520 may be arranged to overlap with each other. That is, the adjacent side surfaces 511 and 521 of the first and second projection members 510 and 520 overlap with the second and first projection members 520 and 510, respectively.

As described above, the first and second projection members 510 and 520 may partially overlap with each other or may be spaced apart from each other by a certain distance without overlap, if necessary.

Figure 4A:
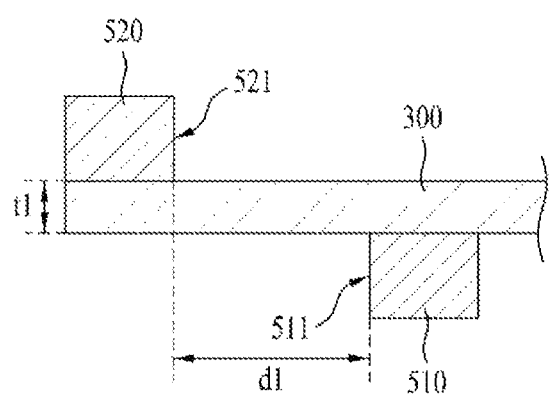
FIGS. 4A to 4C are sectional views illustrating the distance between the first and second projection members.
Figure 4B:
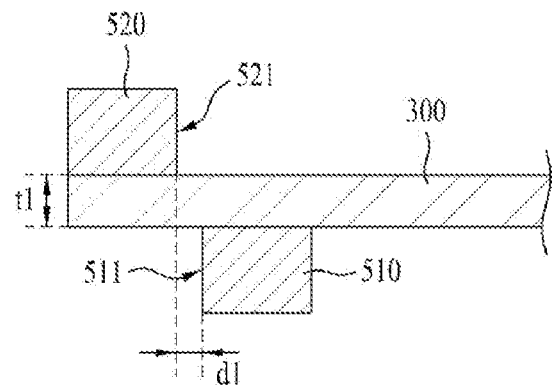
Figure 4C:
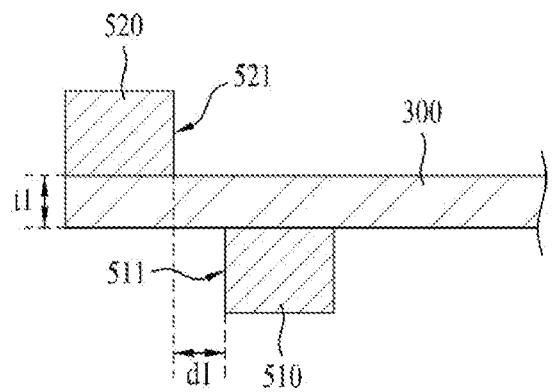

FIGS. 4A to 4C are sectional views illustrating the distance between the first and second projection members.

As shown in FIG. 4A, the first projection member 510 is disposed at the lower surface of the optical member 300, whereas the second projection member 520 is disposed at the upper surface of the optical member 300. In this case, the first and second projection members 510 and 520 may be misaligned with each other.

In this case, the first and second projection members 510 and 520 may be spaced apart from each other by a distance d1 corresponding to a spacing between adjacent side surfaces 511 and 521 thereof.

The distance d1 between the adjacent side surfaces 511 and 521 of the first and second projection members 510 and 520 may be more than a thickness t1 of the optical member 300.

If necessary, as shown in FIG. 4B, the distance d1 between the adjacent side surfaces 511 and 521 of the first and second projection members 510 and 520 may be less than the thickness t1 of the optical member 300.

Alternatively, as shown in FIG. 4C, the distance d1 between the adjacent side surfaces 511 and 521 of the first and second projection members 510 and 520 may be equal to the thickness t1 of the optical member 300.

Since downward bending of the optical member 300 may be varied in accordance with the area size of the optical member 300, it is necessary to vary the distance between the first and second projection members 510 and 520, as described above.

For example, when increased downward bending of the optical member 300 may occur, the distance d1 between the first and second projection members 510 and 520 may be set to be increased. On the other hand, when reduced downward bending of the optical member 300 may occur, the distance d1 between the first and second projection members 510 and 520 may be set to be reduced.

FIGS. 5A to 5D are sectional views illustrating arrangement of the second projection member.

As shown in FIGS. 5A to 5D, the second projection member 520 may be disposed at the upper surface of the optical member 300. In this case, the second projection member 520 may be arranged adjacent to an end 301 of the optical member 300.

One side surface 521 of the second projection member 520 may be arranged toward the central region of the optical member 300. The other side surface 522 of the second projection member 520 may be arranged toward the end 301 of the optical member 300.

Figure 5A:
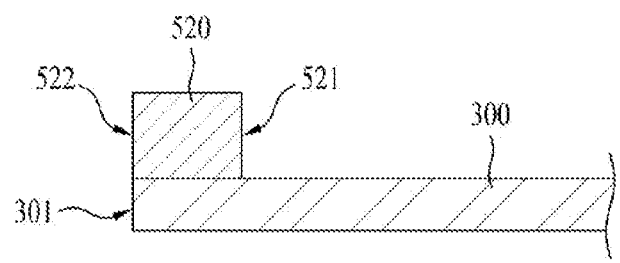
FIGS. 5A to 5D are sectional views illustrating arrangement of the second projection member.

As shown in FIG. 5A, the other side surface 522 of the second projection member 520 may be aligned with a surface of the end 301 of the optical member 300.

Figure 5B:
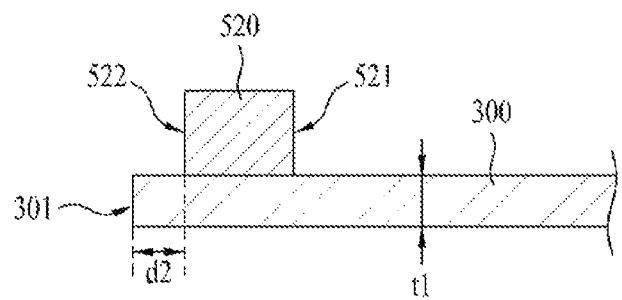

If necessary, as shown in FIG. 5B, the other side surface 522 of the second projection member 520 may be spaced apart from the surface of the end 301 of the optical member 300 by a distance d2.

The distance d2 between the other side surface 522 of the second projection member 520 and the surface of the end 301 of the optical member 300 may be equal to the thickness t1 of the optical member 300.

Figure 5C:
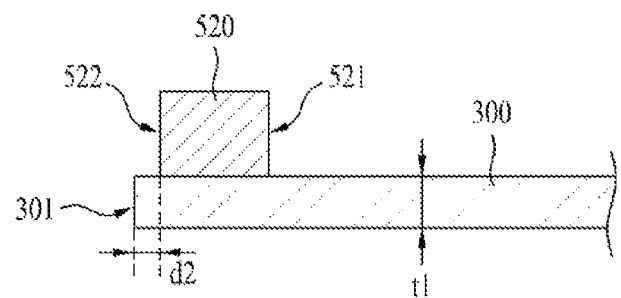

Alternatively, as shown in FIG. 5C, the distance d2 between the other side surface 522 of the second projection member 520 and the surface of the end 301 of the optical member 300 may be less than the thickness t1 of the optical member 300.

Figure 5D:
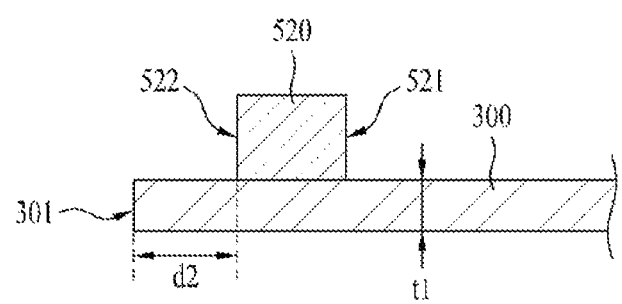

Also, as shown in FIG. 5D, the distance d2 between the other side surface 522 of the second projection member 520 and the surface of the end 301 of the optical member 300 may be more than the thickness t1 of the optical member 300.

Since downward bending of the optical member 300 may be varied in accordance with the area size of the optical member 300, it is necessary to control force to downwardly press the end of the optical member 300. For this reason, it is necessary to vary the arrangement of the second projection member 520, as described above.

Figure 6A:
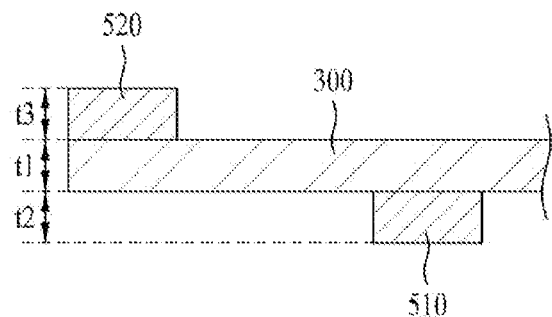
FIGS. 6A to 6C are sectional views illustrating thicknesses of the first and second projection members.
Figure 6B:
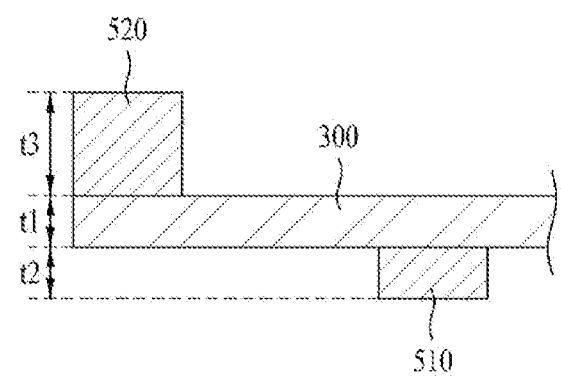
Figure 6C:
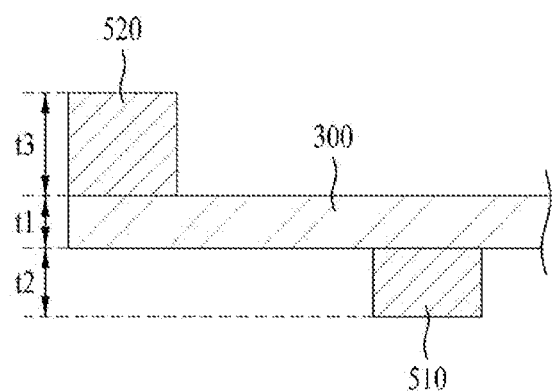

FIGS. 6A to 6C are sectional views illustrating thicknesses of the first and second projection members.

As shown in FIGS. 6A to 6C, the first projection member 510 is disposed at the lower surface of the optical member 300, whereas the second projection member 520 is disposed at the upper surface of the optical member 300. In this case, the first and second projection members 510 and 520 may be misaligned with each other.

In this case, as shown in FIG. 6A, the thickness of the first projection member 510, namely, a thickness t2, may be equal to the thickness of the second projection member 520, namely, a thickness t3.

The thicknesses t2 and t3 of the first and second projection members 510 and 520 may be equal to the thickness t1 of the optical member 300.

Alternatively, as shown in FIG. 6B, the thickness t2 of the first projection member 510 may be smaller than the thickness t3 of the second projection member 520.

Also, the thickness t2 of the first projection member 510 may be equal to the thickness t1 of the optical member 300. The thickness t3 of the second projection member 520 may be greater than the thickness t1 of the optical member 300.

Also, as shown in FIG. 6C, the thickness t2 of the first projection member 510 may be smaller than the thickness t3 of the second projection member 520.

In this case, the thickness t2 of the first projection member 510 may be greater than the thickness t1 of the optical member 300. The thickness t3 of the second projection member 520 may also be greater than the thickness t1 of the optical member 300.

Since downward bending of the optical member 300 may be varied in accordance with the area size of the optical member 300, it is necessary to control force to downwardly press the end of the optical member 300. For this reason, it is necessary to vary the thicknesses of the first and second projection members 510 and 520, as described above.

Figure 7A:
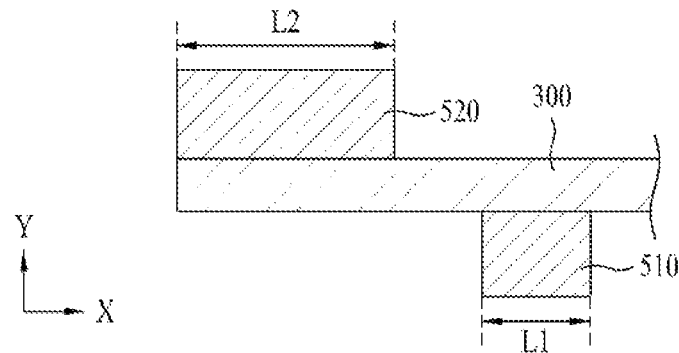
FIGS. 7A to 7C are sectional views illustrating lengths of the first and second projection members.
Figure 7B:
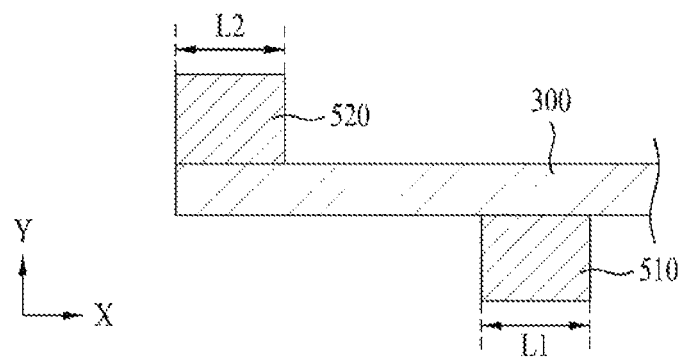
Figure 7C:
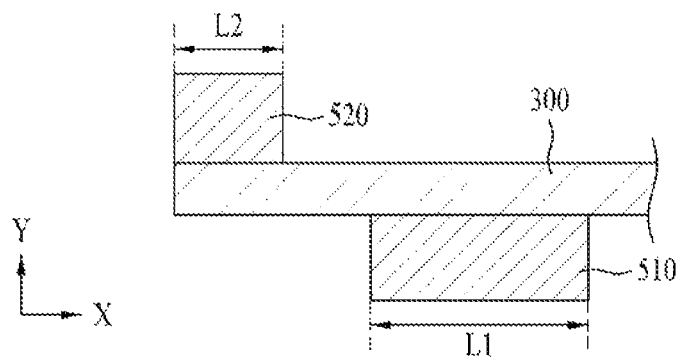

FIGS. 7A to 7C are sectional views illustrating lengths of the first and second projection members.

As shown in FIGS. 7A to 7C, the first projection member 510 is disposed at the lower surface of the optical member 300, whereas the second projection member 520 is disposed at the upper surface of the optical member 300. In this case, the first and second projection members 510 and 520 may be misaligned with each other.

In this case, as shown in FIG. 7A, the length of the first projection member 510, namely, a length L1, may be shorter than the length of the second projection member 520, namely, a length L2.

The lengths L1 and L2 represent lengths of the first and second projection members 510 and 520 in a direction X from the end region of the optical member 300 to the central region of the optical member 300, respectively.

Alternatively, as shown in FIG. 7B, the length L1 of the first projection member 510 may be equal to the length L2 of the second projection member 520.

If necessary, as shown in FIG. 7C, the length L1 of the first projection member 510 may be longer than the length L2 of the second projection member 520.

Since downward bending of the optical member 300 may be varied in accordance with the area size of the optical member 300, it is necessary to control force to downwardly press the end of the optical member 300. For this reason, it is necessary to vary the lengths of the first and second projection members 510 and 520, as described above.

Figure 8A:
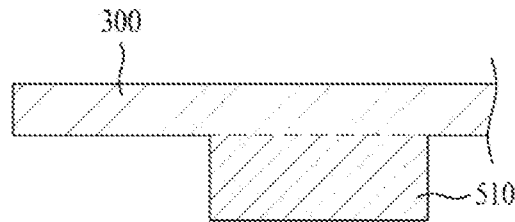
FIGS. 8A and 8B are sectional views explaining the material of the first projection member according to a first embodiment.
Figure 8B:
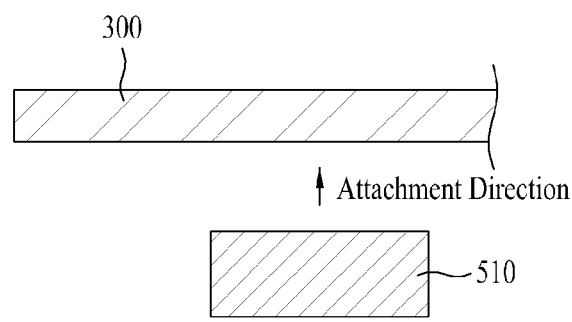

FIGS. 8A and 8B are sectional views explaining the material of the first projection member according to a first embodiment.

As shown in FIG. 8A, the first projection member 510 may have an integrated structure such that it may be protruded from the lower surface of the optical member 300.

That is, the first projection member 510 may be made of the same material as that of the optical member 300, and may be integrated with the optical member 300 to form a single body.

If necessary, as shown in FIG. 8B, the first projection member 510 may have a separate structure such that it may be attached to the lower surface of the optical member 300.

That is, the first projection member 510 may be made of a material different from that of the optical member 300, and may be separable from the optical member 300.

In this case, the first projection member 510 may be any one of a bonding member, a buffering member, and a fastening member.

Figure 9A:
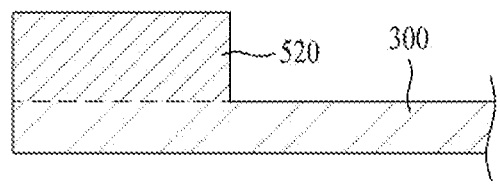
FIGS. 9A and 9B are sectional views explaining the material of the second projection member.
Figure 9B:
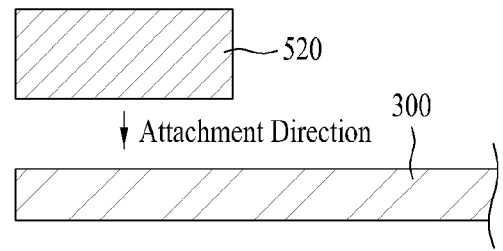

FIGS. 9A and 9B are sectional views explaining the material of the second projection member.

As shown in FIG. 9A, the second projection member 520 may have an integrated structure such that it may be protruded from the upper surface of the optical member 300.

That is, the second projection member 520 may be made of the same material as that of the optical member 300, and may be integrated with the optical member 300 to form a single body.

If necessary, as shown in FIG. 9B, the second projection member 520 may have a separate structure such that it may be attached to the upper surface of the optical member 300.

That is, the second projection member 520 may be made of a material different from that of the optical member 300, and may be separable from the optical member 300.

In this case, the second projection member 520 may be any one of a bonding member, a buffering member, and a fastening member.

Figure 10A:
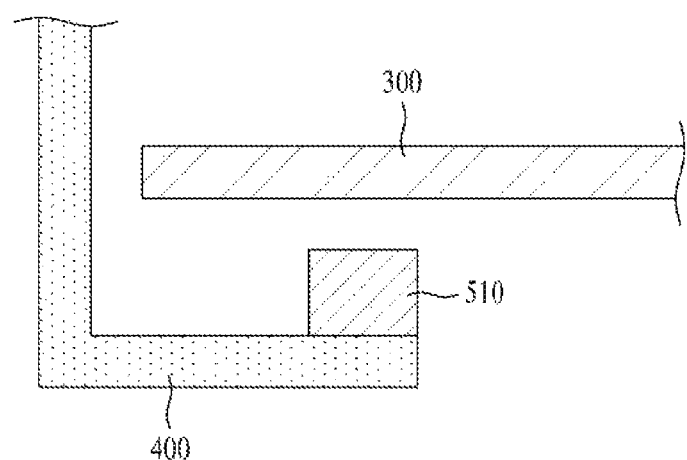
FIGS. 10A and 10B are sectional views explaining the material of the first projection member according to a second embodiment.
Figure 10B:
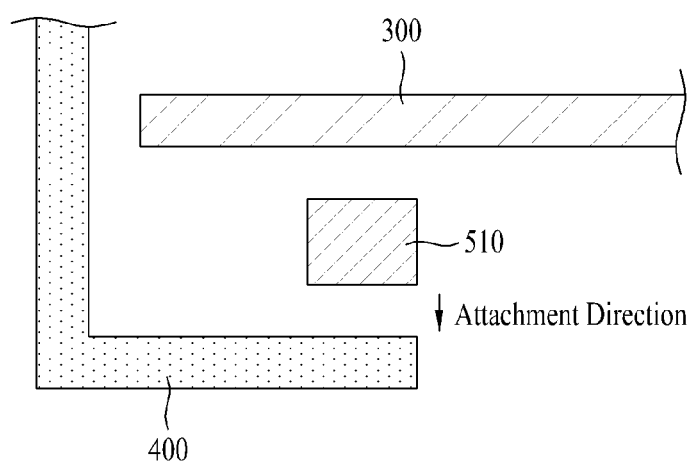

FIGS. 10A and 10B are sectional views explaining the material of the first projection member according to a second embodiment.

As shown in FIG. 10A, the first projection member 510 may have an integrated structure such that it may be protruded from a lower surface of the cover member 400.

That is, the first projection member 510 may be made of the same material as that of the cover member 400, and may be integrated with the cover member 400 to form a single body.

If necessary, as shown in FIG. 10B, the first projection member 510 may have a separate structure such that it may be attached to the lower surface of the cover member 400.

That is, the first projection member 510 may be made of a material different from that of the cover member 400, and may be separable from the cover member 400.

In this case, the first projection member 510 may be any one of a bonding member, a buffering member, and a fastening member.

Figure 11:
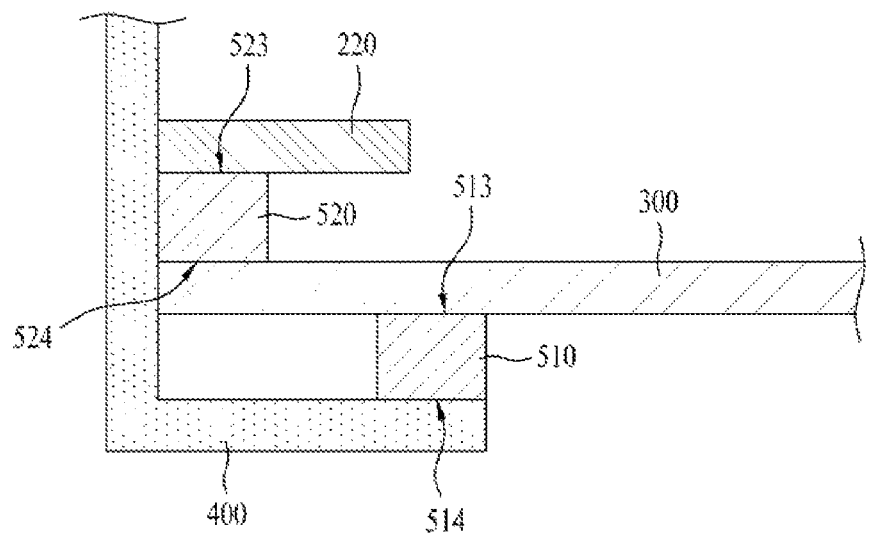
FIG. 11 is a sectional view comparing the materials of the first and second projection members.

FIG. 11 is a sectional view comparing the materials of the first and second projection members.

As shown in FIG. 11, the first projection member 510 is disposed at the lower surface of the optical member 300, whereas the second projection member 520 is disposed at the upper surface of the optical member 300. In this case, the first and second projection members 510 and 520 may be misaligned with each other.

The first projection member 510 may include a first surface 514 facing the cover member 400, and a second surface 513 facing the optical member 300. The second projection member 520 may include a third surface 524 facing the optical member 300, and a fourth surface 523 facing the second reflector 220.

The first projection member 510 may be made of the same material as that of the cover member 400 or optical member 300. Alternatively, the first projection member 510 may be made of a material different from that of the cover member 400 or optical member 300. In the latter case, the first projection member 510 may be any one of a bonding member, a buffering member, and a fastening member.

The second projection member 520 may be made of the same material as that of the second reflector 220 or optical member 300. Alternatively, the second projection member 520 may be made of a material different from that of the second reflector 220 or optical member 300. In the latter case, the second projection member 520 may be any one of a bonding member, a buffering member, and a fastening member.

Also, the first and second projection members 510 and 520 may be made of the same material. If necessary, or the first and second projection members 510 and 520 may be made of different materials Alternatively, any one of a bonding member, a buffering member, and a fastening member may be disposed on at least one of the first and second surfaces 514 and 513 of the first projection member 510 and the third and fourth surfaces 524 and 523 of the second projection member 520.

Figure 12:
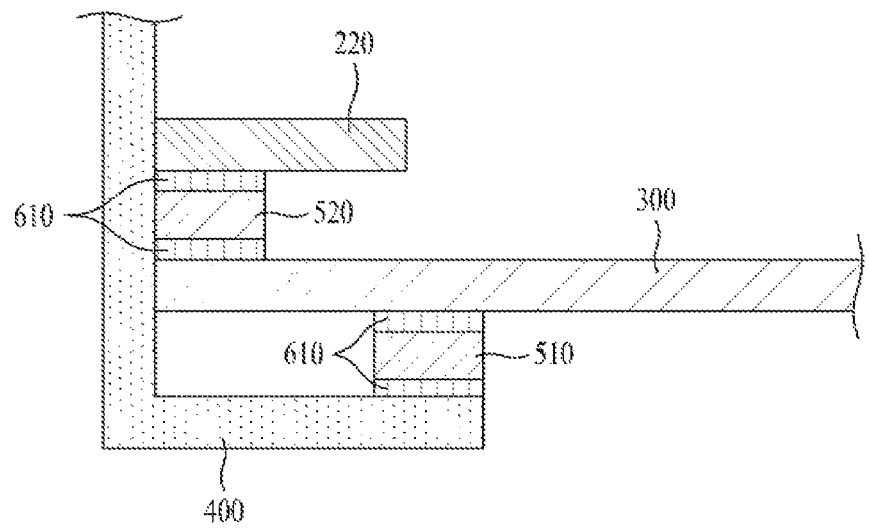
FIG. 12 is a sectional view illustrating the case in which bonding members are provided at the first and second projection members, respectively.

FIG. 12 is a sectional view illustrating the case in which bonding members are provided at the first and second projection members, respectively.

As shown in FIG. 12, the first projection member 510 is disposed at the lower surface of the optical member 300, whereas the second projection member 520 is disposed at the upper surface of the optical member 300. In this case, the first and second projection members 510 and 520 may be misaligned with each other.

A bonding member 610 may be disposed at at least one of a region between the first projection member 510 and the cover member 400. Another bonding member 610 may be disposed at at least one of a region between the second projection member 520 and the optical member 300 and a region between the second projection member 520 and the second reflector 220.

The bonding members 610 may be formed by thermally curing a paste of a mixture of thermally conductive powder with liquid-phase silicon rubber or synthetic rubber. The bonding member 610 exhibits excellent bonding reliability.

Also, the bonding members 610 may exhibit excellent thermal conductivity. Accordingly, the bonding members 610 may effectively outwardly dissipate heat transferred from the light source module.

Figure 13:
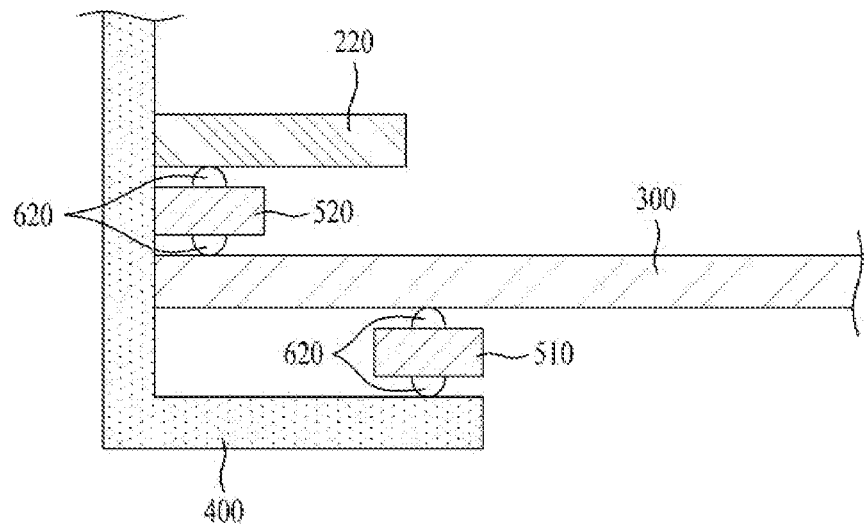
FIG. 13 is a sectional view illustrating the case in which buffering members are provided at the first and second projection members, respectively.

FIG. 13 is a sectional view illustrating the case in which buffering members are provided at the first and second projection members, respectively.

As shown in FIG. 13, the first projection member 510 is disposed at the lower surface of the optical member 300, whereas the second projection member 520 is disposed at the upper surface of the optical member 300. In this case, the first and second projection members 510 and 520 may be misaligned with each other.

A buffering member 620 may be disposed at at least one of a region between the first projection member 510 and the cover member 400. Another buffering member 620 may be disposed at at least one of a region between the second projection member 520 and the optical member 300 and a region between the second projection member 520 and the second reflector 220.

The buffering members 620 may be made of silicon rubber containing thermally conductive powder or synthetic rubber containing thermally conductive powder.

The thermally conductive powder may be powder of a metal, which exhibits excellent thermal conductivity, such as silver (Ag), copper (Cu), gold (Au), or aluminum (Al).

That is, the buffering members 620 may be formed by mixing thermally conductive powder with liquid-phase silicon rubber or synthetic rubber, and thermally curing the resultant mixture.

The reason why the buffering members 620 are arranged is to prevent damage of the optical member 300, which is weak to external impact, by the first and second projection members 510 and 520.

Also, the buffering members 620 may exhibit excellent thermal conductivity. Accordingly, the buffering members 620 may effectively outwardly dissipate heat transferred from the light source module.

Figure 14:
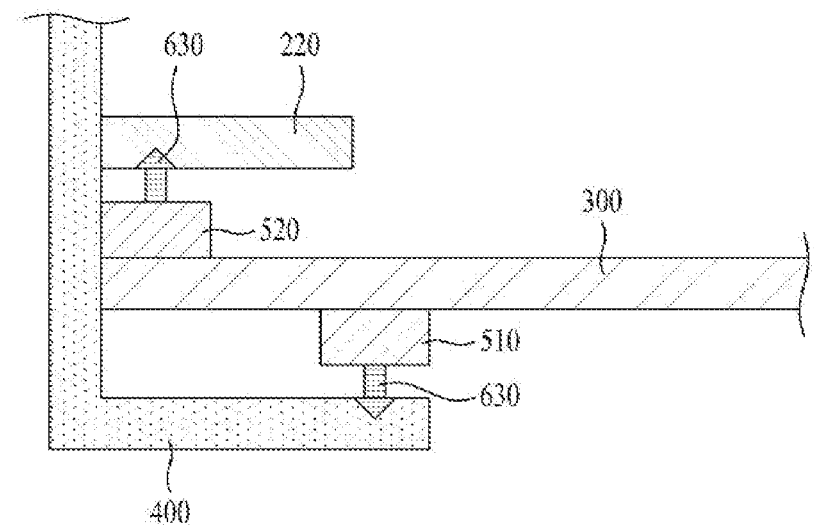
FIG. 14 is a sectional view illustrating the case in which fastening members are provided at the first and second projection members, respectively.

FIG. 14 is a sectional view illustrating the case in which fastening members are provided at the first and second projection members, respectively.

As shown in FIG. 14, the first projection member 510 is disposed at the lower surface of the optical member 300, whereas the second projection member 520 is disposed at the upper surface of the optical member 300. In this case, the first and second projection members 510 and 520 may be misaligned with each other.

A fastening member 630 may be disposed at at least one of a region between the first projection member 510 and the cover member 400. Another fastening member 630 may be disposed at at least one of a region between the second projection member 520 and the optical member 300 and a region between the second projection member 520 and the second reflector 220.

The fastening members 630 may be fastening screws. The fastening members 630 may be made of a metal, which exhibits excellent thermal conductivity, such as silver (Ag), copper (Cu), gold (Au), or aluminum (Al).

In accordance with arrangement of the fastening members 630, the first and second projections members 510 and 520 may be firmly fixed. Accordingly, it may be possible not only to prevent downward bending of the optical member 300, but also to effectively outwardly dissipate heat transferred from the light source module.

Figure 15A:
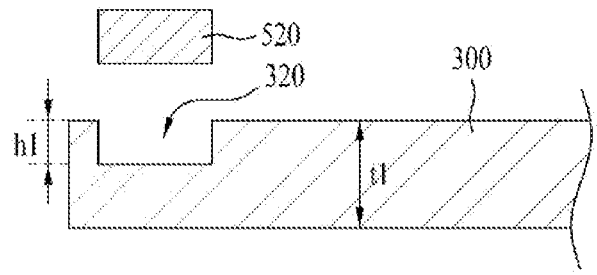
FIGS. 15A to 15C are sectional views illustrating various structures of the optical member including grooves.
Figure 15B:
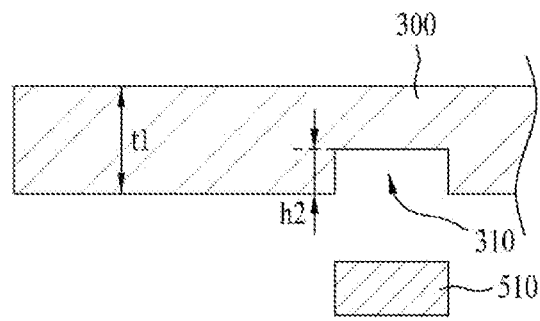
Figure 15C:
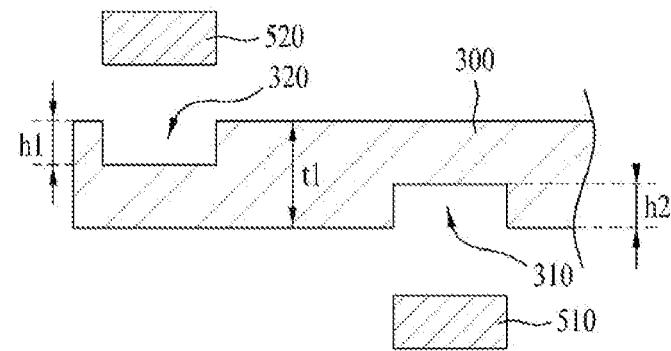

FIGS. 15A to 15C are sectional views illustrating various structures of the optical member including grooves.

As shown in FIG. 15A, the optical member 300 may include at least one second groove 320 formed at a region facing the second projection member 520.

The second groove 320 may have a larger area than the second projection member 520.

If necessary, the second groove 320 may have an area equal to that of the second projection member 520.

The second groove 320 may have a height h1 less than the thickness t1 of the optical member 300. In this case, the ratio of the height h1 of the second groove 320 to the thickness t1 of the optical member 300 may be 1:2 to 10.

If the height h1 of the second groove 320 is excessively low, there may be a difficulty in fixing the second projection member 520. On the other hand, if the height h1 is excessively high, the optical member 300 may be easily broken.

Also, as shown in FIG. 15B, the optical member 300 may include at least one first groove 310 formed at a region facing the first projection member 510.

The first groove 310 may have a larger area than the first projection member 510.

If necessary, the first groove 310 may have an area equal to that of the first projection member 510.

The first groove 310 may have a height h2 less than the thickness t1 of the optical member 300. In this case, the ratio of the height h2 of the first groove 310 to the thickness t1 of the optical member 300 may be 1:2 to 10.

If the height h1 of the first groove 310 is excessively low, there may be a difficulty in fixing the first projection member 510. On the other hand, if the height h1 is excessively high, the optical member 300 may be easily broken.

Alternatively, as shown in FIG. 15C, the optical member 300 may include at least one first groove 310 formed at a region facing the first projection member 510, and at least one second groove 320 formed at a region facing the second projection member 520.

The first groove 310 may have a larger area than the first projection member 510. Also, the second groove 320 may have a larger area than the second projection member 520.

If necessary, the first groove 310 may have an area equal to that of the first projection member 510. The second groove 320 may have an area equal to that of the second projection member 520, if necessary.

Figure 16:
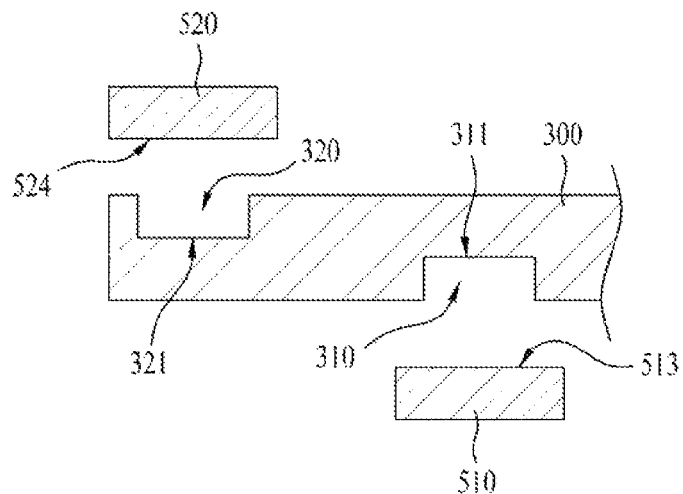
FIG. 16 is a sectional view illustrating the sizes of grooves of the optical member.

FIG. 16 is a sectional view illustrating the sizes of the grooves of the optical member.

As shown in FIG. 16, the optical member 300 may include at least one first groove 310 formed at a region facing the first projection member 510, and at least one second groove 320 formed at a region facing the second projection member 520.

The first groove 310 may have a bottom surface 311 having a smaller area than a second surface 513 of the first projection member 510.

Also, the second groove 320 may have a bottom surface 321 having a smaller area than a third surface 524 of the second projection member 520.

Accordingly, an air gap may be formed between the bottom surface 311 of the first groove 310 and the second surface 513 of the first projection member 510. Also, an air gap may be formed between the bottom surface 321 of the second groove 320 and the third surface 524 of the second projection member 520.

If necessary, any one of a bonding member, a buffering member, and a fastening member may be interposed in each of a region between the bottom surface 311 of the first groove 310 and the second surface 513 of the first projection member 510 and a region between the bottom surface 321 of the second groove 320 and the third surface 524 of the second projection member 520.

Figure 17A:
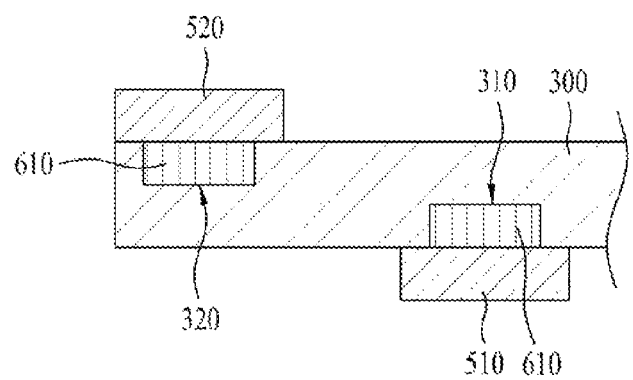
FIGS. 17A to 17C are sectional views illustrating the first and second projection members which are disposed at respective grooves of the optical member.
Figure 17B:
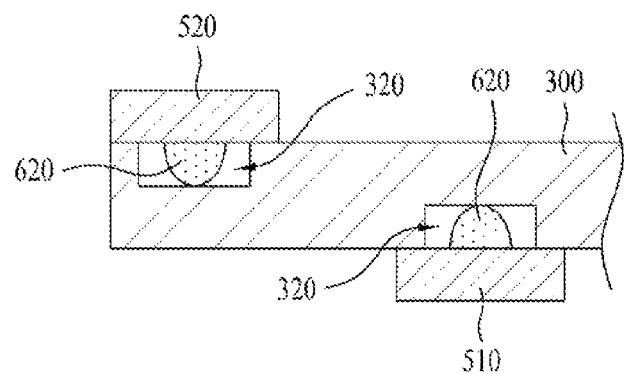
Figure 17C:
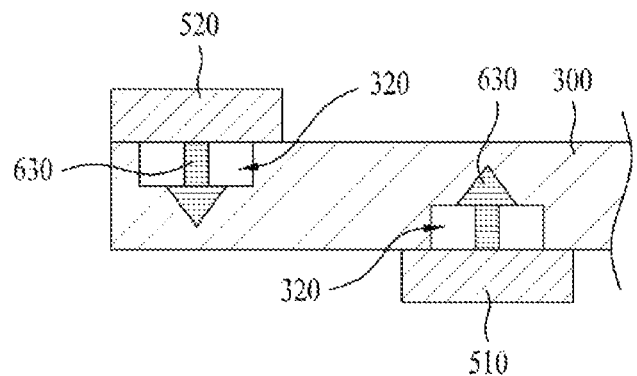

FIGS. 17A to 17C are sectional views illustrating the first and second projection members which are disposed at respective grooves of the optical member.

As shown in FIG. 17A, the optical member 300 may include at least one first groove 310 formed at a region facing the first projection member 510, and at least one second groove 320 formed at a region facing the second projection member 520.

The first groove 310 may have a smaller area than the first projection member 510. Also, the second groove 320 may have a smaller area than the second projection member 520.

A bonding member 610 may be disposed in each of the first and second grooves 310 and 320.

The bonding members 610 may be formed by thermally curing a paste of a mixture of thermally conductive powder with liquid-phase silicon rubber or synthetic rubber. The bonding member 610 exhibits excellent bonding reliability.

As shown in FIG. 17B, a buffering member 620 may be disposed in each of the first and second grooves 310 and 320.

The buffering members 620 may be made of silicon rubber containing thermally conductive powder or synthetic rubber containing thermally conductive powder.

The thermally conductive powder may be powder of a metal, which exhibits excellent thermal conductivity, such as silver (Ag), copper (Cu), gold (Au), or aluminum (Al).

That is, the buffering members 620 may be formed by mixing thermally conductive powder with liquid-phase silicon rubber or synthetic rubber, and thermally curing the resultant mixture.

Alternatively, as shown in FIG. 17C, a buffering member 630 may be disposed in each of the first and second grooves 310 and 320.

The fastening members 630 may be fastening screws. The fastening members 630 may be made of a metal, which exhibits excellent thermal conductivity, such as silver (Ag), copper (Cu), gold (Au), or aluminum (Al).

Figure 18:
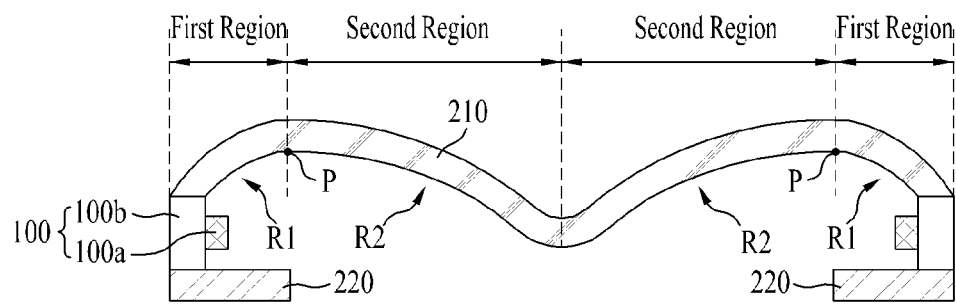
FIG. 18 is a sectional view illustrating first and second reflectors shown in FIG. 1.

FIG. 18 is a sectional view illustrating the first and second reflectors shown in FIG. 1.

As shown in FIG. 18, the first and second reflectors 210 and 220 are arranged at different levels. The light source module 100 may be disposed between the first and second reflectors 210 and 220.

The second reflector 220 may be flat, whereas the first reflector 210 may partially include an inclined surface.

In this case, the inclined surface of the first reflector 210 may have an inclination with respect to a plane of the second reflector 220, namely, a flat surface of the second reflector 220. The inclined surface may include at least two inclined surfaces having at least one inflection point.

For example, the first reflector 210 may include first and second regions arranged adjacent to each other at opposite sides of an inflection point P. The first region may be a first inclined surface, and the second region may be a second inclined surface.

In this case, the first inclined surface may be a curved surface having a first radius of curvature R1, and the second inclined surface may be a curved surface having a second radius of curvature R2.

The first radius of curvature R1 of the first inclined surface and the second radius of curvature R2 of the second inclined surface may be different.

For example, the first inclined surface of the first reflector 210 may be disposed adjacent to the light source module 100. Also, the first radius of curvature R1 of the first inclined surface may be less than the second radius of curvature R2 of the second inclined surface.

FIGS. 19A to 19D are views illustrating various structures of the inclined surface of the first reflector.

Figure 19A:
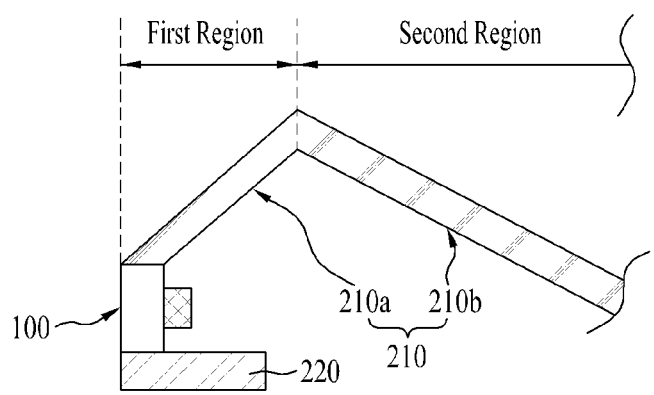
FIGS. 19A to 19D are views illustrating various structures of the inclined surface of the first reflector.

As shown in FIG. 19A, the first reflector 210 may include a first region 210a and a second region 210b. The first region 210a may be an inclination surface partially overlapping with the light source module 100 and second reflector 220 while having an inclination with respect to the flat surface of the reflector 220.

The inclined surface of the first region 210a may be a flat surface upwardly inclined from the light source module 100.

The second region 210b may be an inclined surface having an inclination with respect to the flat surface of the reflector 220. The inclined surface of the second region 210b may be a flat surface downwardly inclined from the inclined surface of the first region 210a.

The inclination of the inclined surface of the first region 210a and the inclination of the inclined surface of the second region 210b may be different.

For example, the inclination of the inclined surface of the first region 210a may be greater than the inclination of the inclined surface of the second region 210b The area of the first region 201a, namely, an area S1, may be greater than the area of the second region 210b, namely, an area S2. The ratio of the area S1 of the first region 210a to the area S2 of the second region 210b may be 1.1 to 20:1.

Figure 19B:
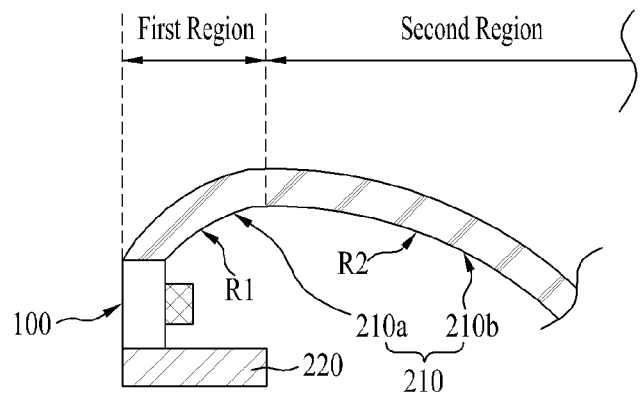

As shown in FIG. 19B, the first reflector 210 may include a first region 210a and a second region 210b. The first region 210a may be an inclination surface partially overlapping with the light source module 100 and second reflector 220 while having an inclination with respect to the flat surface of the reflector 220.

The inclined surface of the first region 210a may be a concave surface upwardly inclined from the light source module 100.

The second region 210b may be an inclined surface having an inclination with respect to the flat surface of the reflector 220. The inclined surface of the second region 210b may be a concave surface downwardly inclined from the inclined surface of the first region 210a.

The radius of curvature of the inclined surface of the first region 210a and the radius of curvature of the inclined surface of the second region 210b may be different.

The area of the first region 201a, namely, an area S1, may be greater than the area of the second region 210b, namely, an area S2. The ratio of the area S1 of the first region 210a to the area S2 of the second region 210b may be 1.1 to 20:1.

Figure 19C:
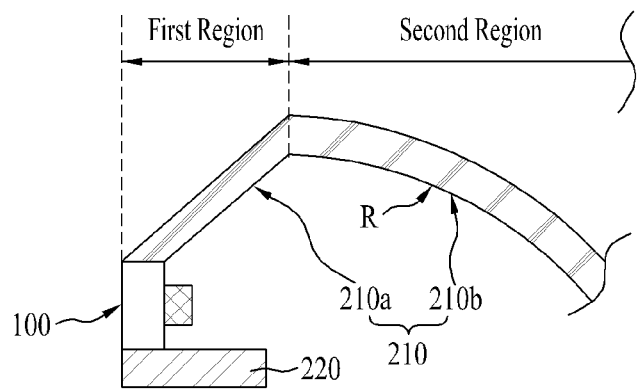

As shown in FIG. 19C, the first reflector 210 may include a first region 210a and a second region 210b. The first region 210a may be an inclination surface partially overlapping with the light source module 100 and second reflector 220 while having an inclination with respect to the flat surface of the reflector 220.

The inclined surface of the first region 210a may be a flat surface upwardly inclined from the light source module 100.

The second region 210b may be an inclined surface having an inclination with respect to the flat surface of the reflector 220. The inclined surface of the second region 210b may be a concave surface downwardly inclined from the inclined surface of the first region 210a.

The area of the first region 201a, namely, an area S1, may be greater than the area of the second region 210b, namely, an area S2. The ratio of the area S1 of the first region 210a to the area S2 of the second region 210b may be 1.1 to 20:1.

Figure 19D:
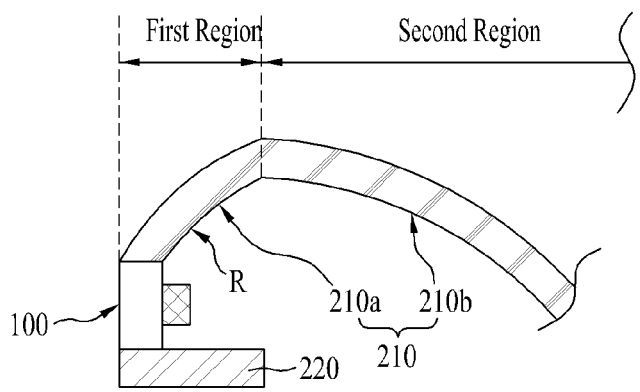

As shown in FIG. 19D, the first reflector 210 may include a first region 210a and a second region 210b. The first region 210a may be an inclination surface partially overlapping with the light source module 100 and second reflector 220 while having an inclination with respect to the flat surface of the reflector 220.

The inclined surface of the first region 210a may be a concave surface upwardly inclined from the light source module 100.

The second region 210b may be an inclined surface having an inclination with respect to the flat surface of the reflector 220. The inclined surface of the second region 210b may be a flat surface downwardly inclined from the inclined surface of the first region 210a.

The area of the first region 201a, namely, an area S1, may be greater than the area of the second region 210b, namely, an area S2. The ratio of the area S1 of the first region 210a to the area S2 of the second region 210b may be 1.1 to 20:1.

Figure 20A:
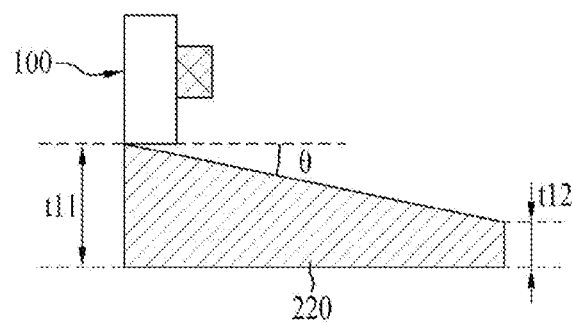
FIGS. 20A to 20D are views illustrating various structures of the second reflector which has an inclined surface.
Figure 20B:
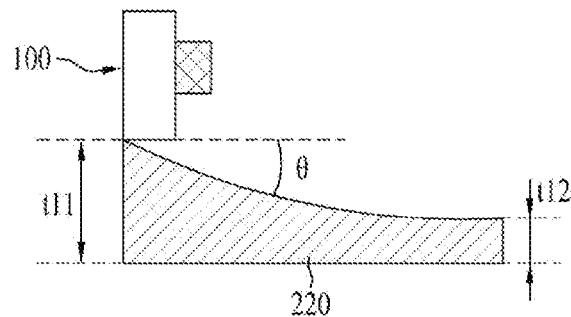
Figure 20C:
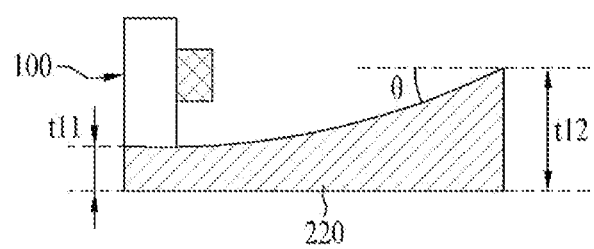
Figure 20D:
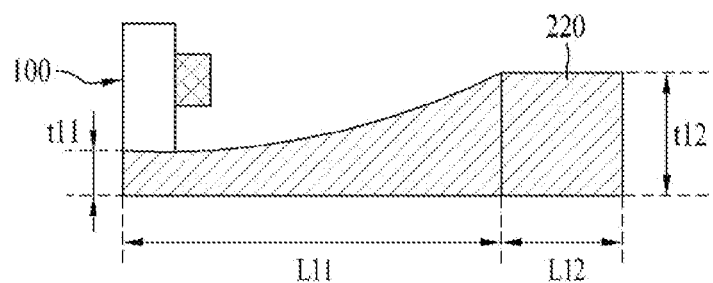

FIGS. 20A to 20D are views illustrating various structures of the second reflector which has an inclined surface. FIG. 20A illustrates the case in which the inclined surface of the second reflector is a flat surface. Each of FIGS. 20B, 20C and 20D illustrates the case in which the inclined surface of the second reflector is a curved surface.

As shown in each of FIGS. 20A to 20D, one surface of the second reflector 220 facing the light source module 100 may include an inclined surface having an inclination of a predetermined angle with respect to the other surface of the second reflector 220.

The inclined surface of the second reflector 220 may be inclined at an inclination angle $\theta$ of 1 to 85° with respect to a horizontal plane parallel to the other surface of the second reflector 220.

Thus, the thickness of the second reflector 220 may be gradually reduced or increased as the second reflector 220 is spaced away from the light source module 100.

That is, the thickness of the second reflector 220 in a region adjacent to the light source module 100, namely, a thickness t1, may differ from the thickness of the second reflector 220 in a region remote from the light source module 100, namely, a thickness t2. As shown in FIGS. 20A and 20B, the thickness t1 in the region adjacent to the light source module 100 may be greater than the thickness t2 in the region remote from the light source module 100.

If necessary, as shown in FIGS. 20C and 20D, the thickness t1 in the region adjacent to the light source module 100 may be smaller than the thickness t2 in the region remote from the light source module 100.

Also, as shown in FIG. 20D, the second reflector 220 may include either an inclined surface or a flat surface.

That is, the second reflector 220 may include an inclined surface in a region adjacent to the light source module 100, and a flat surface in a region remote from the light source module 100.

In this case, the length of the inclined surface, namely, a length L11, may be equal to the length of the flat surface, namely, a length L12. If necessary, the lengths L11 and L12 may be different.

Predetermined reflection patterns may be formed at one surface of the second reflector 220.

FIGS. 21A to 21D are views illustrating various structures of the second reflector which has reflection patterns, respectively.

Figure 21A:
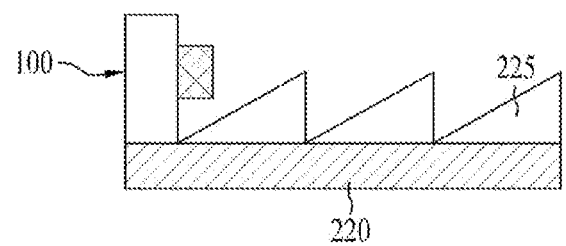
FIGS. 21A to 21D are views illustrating various structures of the second reflector which has reflection patterns, respectively.
Figure 21B:
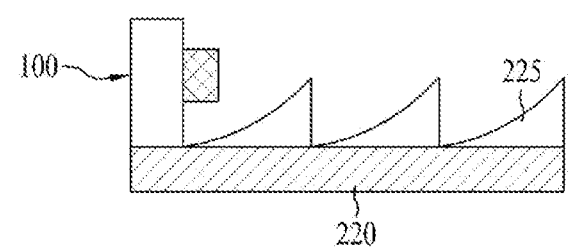
Figure 21C:
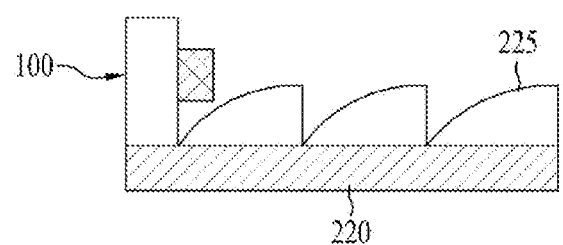

In the case of FIG. 21A, each reflection pattern, which is designated by reference numeral "225", may have a sawtooth shape, and the surface of the reflection pattern 225 may be a flat surface. In the case of FIG. 21B or 21C, the reflection pattern 225 may have a sawtooth shape, and the surface of the reflection pattern 225 may be a curved surface.

In the case of FIG. 21B, the surface of the reflection pattern 225 is a concave surface. In the case of FIG. 21C, the surface of the reflection pattern 225 is a convex surface.

Figure 21D:
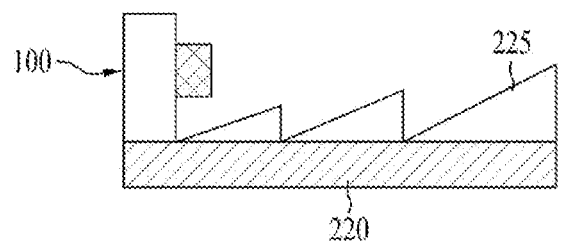

If necessary, as shown in FIG. 21D, the reflection pattern 210 may have a size gradually increasing as the reflection pattern 225 extends from an end of the second reflector 220 to an open region.

As the reflection patterns 225 are formed on the second reflector 220, it may be possible not only to achieve reflection of light, but also to obtain diffusion effects of uniformly dispersing light.

In this regard, the reflection patterns 225 may be formed at desired regions while having various sizes in accordance with the brightness distribution of the entire structure of the illumination unit.

FIGS. 22A to 22D are views explaining arrangement relations of the light source module with the first and second reflectors.

Figure 22A:
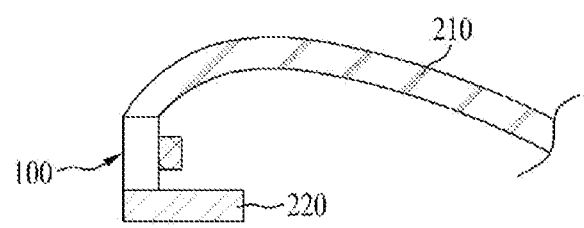
FIGS. 22A to 22D are views explaining arrangement relations of the light source module with the first and second reflectors.

As shown in FIG. 22A, the light source module 100 may be in contact with the first reflector 210 and second reflector 220.

In accordance with such an arrangement of the light source module 100, it may be possible not only to obtain uniform brightness of the illumination unit, but also to reduce the thickness of the entire structure of the illumination unit.

Figure 22B:
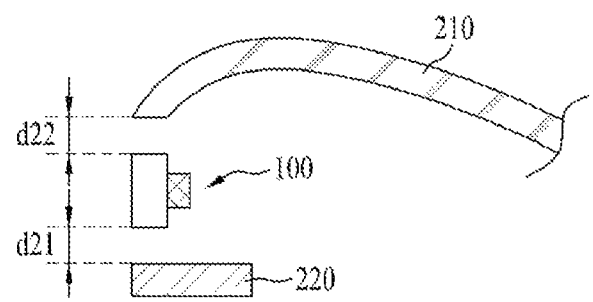

As shown in FIG. 22B, the light source module 100 may be spaced apart from the second reflector 220 by a first distance d21 while being spaced apart from the first reflector 210 by a second distance d22.

The first and second distances d21 and d22 may be equal or may be different.

For example, the first distance d21 may be shorter than the second distance d22.

Figure 22C:
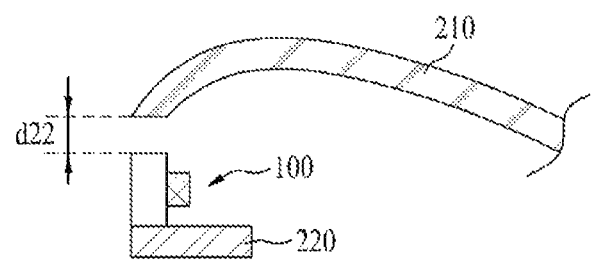

Also, as shown in FIG. 22C, the light source module 100 may be in contact with the second reflector 220 while being spaced apart from the first reflector 210 by the distance d22.

In this case, it may be possible to avoid a hot spot phenomenon, and to transmit light to an area remote from the light source module 100 because the light source module 100 is in contact with the second reflector 220.

Figure 22D:
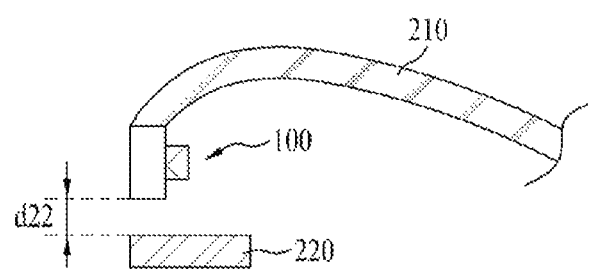

Alternatively, as shown in FIG. 22D, the light source module 100 may be spaced apart from the second reflector 220 by the distance d22 while being in contact with the first reflector 210.

Figure 23:
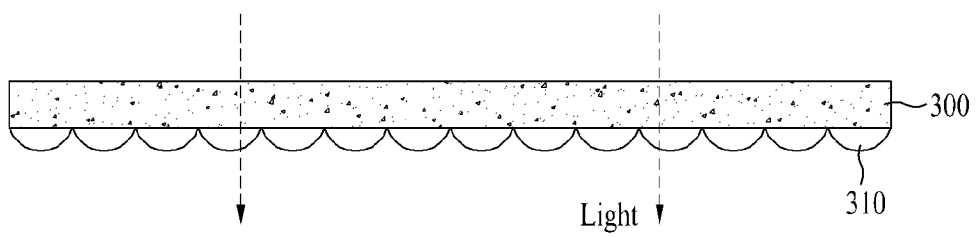
FIG. 23 is a sectional view illustrating the optical member of FIG. 1.

FIG. 23 is a sectional view illustrating the optical member of FIG. 1.

As shown in FIG. 23, the optical member 300 may include a projection/groove pattern 310 formed at an upper surface of the optical member 300.

The optical member 300 is adapted to diffuse light emitted from the light source module 100. In order to enhance diffusion effects, the projection/groove pattern 310 may be formed at the upper surface of the optical member 300.

That is, the optical member 300 may have a multilayer structure having several layers. In this case, the projection/groove pattern 310 may be formed at a surface of an uppermost one of the layers or a surface of one of the layers.

The projection/groove pattern 310 may have a stripe shape extending along the light source module 100.

In this case, the projection/groove pattern 310 may include projections protruded from the surface of optical member 300. Each projection has first and second facets facing each other. The facing first and second facets form an angle, which may be acute or obtuse.

If necessary, the optical member 300 may be formed using at least one sheet. In this case, the optical member 300 may selectively include a diffusion sheet, a prism sheet, a brightness enhancing sheet, etc.

The diffusion sheet diffuses light emitted from the light sources. The prism sheet guides diffused light to a light emission region. The brightness enhancing sheet enhances brightness of light.

In the above-described embodiments, projection members may be arranged at end portions of the optical member, to eliminate or reduce downward bending of the optical member.

Also, in the above-described embodiments, the illumination unit employs reflectors for air guide, each of which has an inclined surface at a portion thereof, without employing a light guide plate. Accordingly, it may be possible to achieve a reduction in weight, a reduction in manufacturing cost, and uniformity of brightness.

Thus, the illumination unit may have enhanced economy and enhanced reliability. Also, the illumination unit is suitable for a wide indoor space.

Also, it may be possible to implement a display apparatus, an indication apparatus or an illumination system, which employs the first and second projection members described in the above embodiments. The illumination system may include, for example, a lamp or a street lamp.

Figure 24:
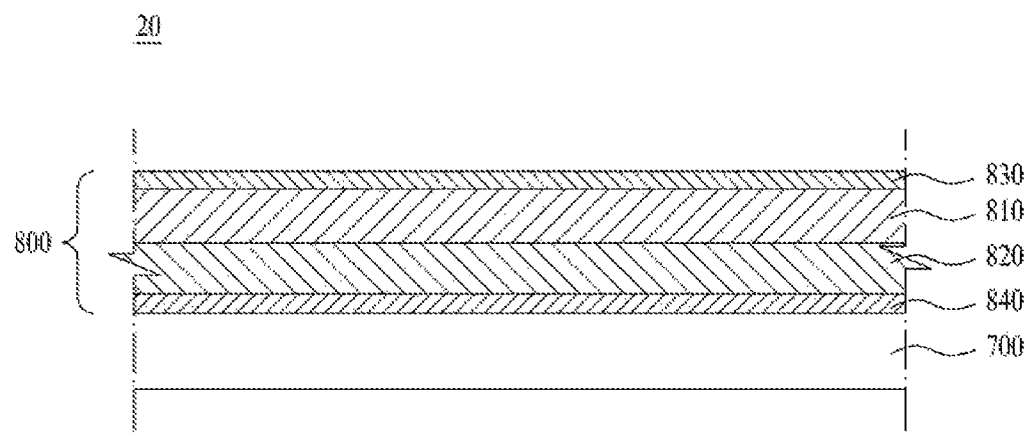
FIG. 24 is a view illustrating a display module including an illumination unit according to an embodiment.

FIG. 24 is a view illustrating a display module including an illumination unit according to an embodiment.

As shown in FIG. 24, the display module, which is designated by reference numeral "20", may include a display panel 800 and an illumination unit 700.

The display panel 800 may include a color filter substrate 810 and a thin film transistor (TFT) substrate 820, which are assembled to face each other while forming a uniform cell gap therebetween. A liquid crystal layer (not shown) may be interposed between the two substrates 810 and 820.

An upper polarization plate 830 and a lower polarization plate 840 may be disposed at upper and lower sides of the display panel 800, respectively. In more detail, the upper polarization plate 830 may be disposed on an upper surface of the color filter substrate 810, and the lower polarization plate 840 may be disposed on a lower surface of the TFT substrate 820.

Although not shown, a gate driver and a data driver may be disposed on a side surface of the display panel 800, to generate drive signals for driving of the panel 800.

Figure 25:
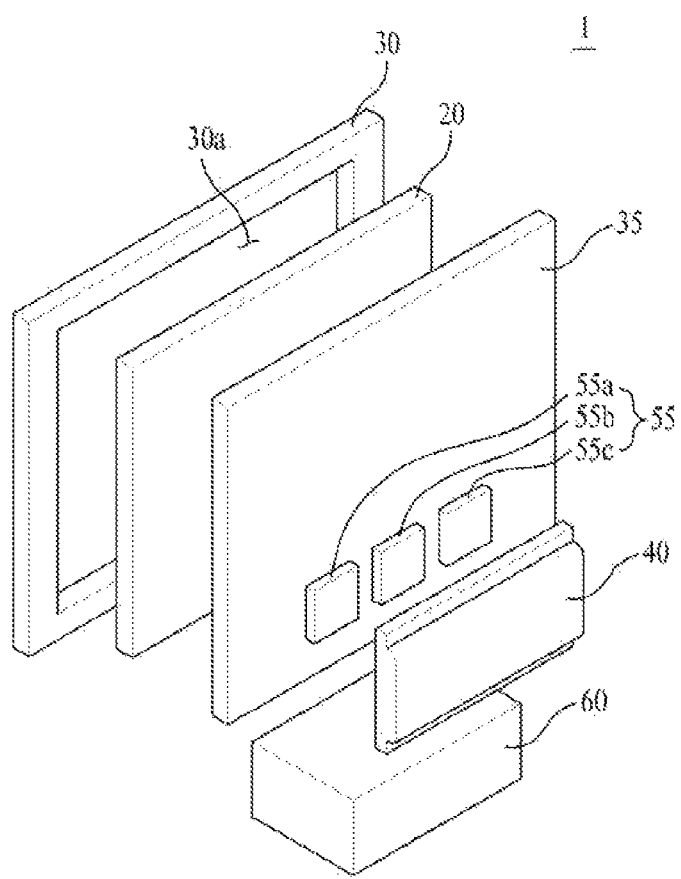
FIGS. 25 and 26 are views illustrating display apparatuses according to different embodiments, respectively.
Figure 26:
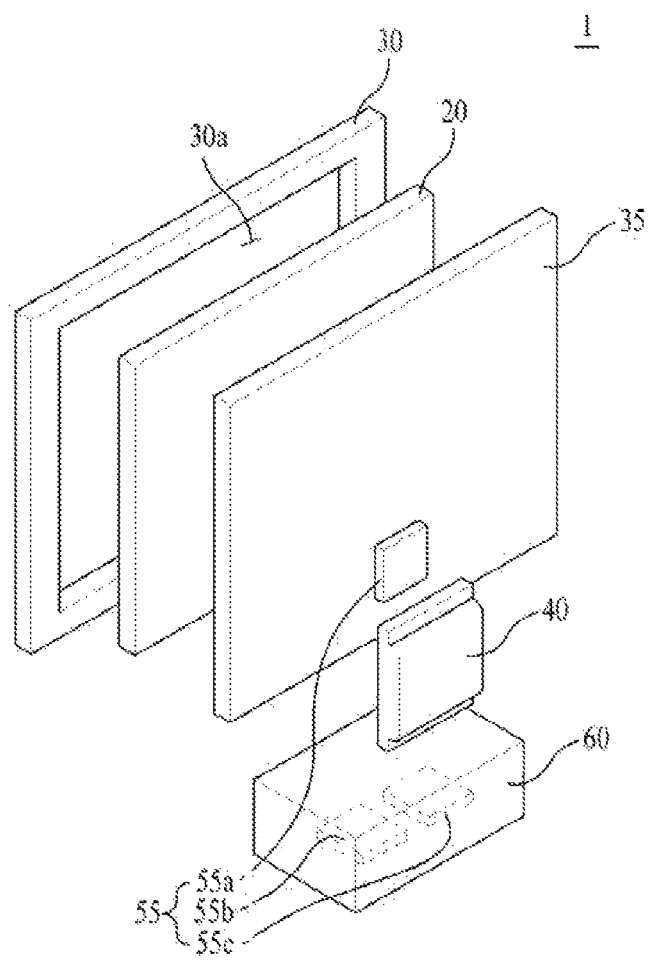

FIGS. 25 and 26 are views illustrating display apparatuses according to different embodiments, respectively.

Referring to FIG. 25, the display apparatus, which is designated by reference numeral "1", includes a display module 20, front and back covers 30 and 35 for surrounding the display module 20, a driver unit 55 mounted to the back cover 35, and a driver cover 40 for surrounding the driver unit 55.

The front cover 30 may include a front panel (not shown) made of a transparent material to allow light to pass therethrough. The front panel is spaced apart from the display module 20 to protect the display module 20. The front panel also allows light emitted from the display module 20 to pass therethrough, thereby allowing an image displayed by the display module 20 to be displayed to the outside of the display module 20.

The back cover 35 is coupled to the front cover 30 to protect the display module 20.

The driver unit 55 may be disposed on one surface of the back cover 35.

The driver unit 55 may include a drive controller 55a, a main board 55b, and a power supplier 55c.

The drive controller 55a may be a timing controller. The driver controller 55a is a driver to control operation timing of each driver IC included in the display module 20. The main board 55b is a driver for transferring V-sync, H-sync, and R, G, and B resolution signals to the timing controller. The power supplier 55c is a driver for applying electric power to the display module 20.

The driver unit 55 may be mounted to the back cover 35, and may be surrounded by the driver cover 40.

A plurality of holes is provided at the back cover 35, to connect the display module 20 and the driver unit 55. A stand 60 to support the display apparatus 1 may be provided.

On the other hand, as shown in FIG. 26, the drive controller 55a of the driver unit 55 may be provided at the back cover 35. The main board 55b and power supplier 55c may be provided at the stand 60.

The driver cover 40 may surround only the driver 55, which is provided at the back cover 35.

Although the main board 55b and power supplier 55c are separately provided in the illustrated embodiment, they may be integrated on a single board, without being limited thereto.

In another embodiment, it may be possible to implement a display apparatus, an indication apparatus or an illumination system, which employs the first and second projection members described in the above embodiments. The illumination system may include, for example, a lamp or a street lamp.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An illumination unit comprising:
    a first reflector;
    a second reflector arranged at either side of the first reflector;
    at least one light source module arranged between the first reflector and the second reflector;
    a cover member for covering the second reflector;
    an optical member arranged between the cover member and the second reflector while facing the first reflector;
    a first projection member interposed between the optical member and the cover member; and
    a second projection member interposed between the optical member and the second reflector,
    wherein a distance from the cover member to one side surface of the first projection member is longer than a distance from the cover member to one side surface of the second projection member.

2. The illumination unit according to claim 1, wherein the first projection member and the second projection member partially overlap with each other.

3. The illumination unit according to claim 1, wherein the side surface of the first projection member and the side surface of the second projection member are spaced apart from each other by a distance different from a thickness of the optical member.

4. The illumination unit according to claim 1, wherein the second projection member has a greater thickness than the first projection member.

5. The illumination unit according to claim 1, wherein at least one of the first and second projection members has a greater thickness than the optical member.

6. The illumination unit according to claim 1, wherein the second projection member has a length different from a length of the first projection member.

7. The illumination unit according to claim 1, wherein the first projection member is made of a material identical to a material of the optical member, and the first projection member and the optical member are integrated to form a single body.

8. The illumination unit according to claim 1, wherein:
    the first projection member comprises a first surface facing the cover member, and a second surface facing optical member;
    the second projection member comprises a third surface facing the optical member, and a fourth surface facing the second reflector; and
    one of a bonding member, a buffering member and a fastening member is disposed on at least one of the first, second, third and fourth surfaces.

9. The illumination unit according to claim 1, wherein the optical member comprises at lest one groove formed at a region facing the first projection member or the second projection member.

10. The illumination unit according to claim 9, wherein the groove has a smaller area than the first projection member or the second projection member.

11. The illumination unit according to claim 1, wherein the first reflector is not parallel with the optical member, and the second reflector is parallel with the optical member.

12. The illumination unit according to claim 1, wherein the first reflector comprises at least two inclined surfaces having at least one inflection point.

13. The illumination unit according to claim 1, wherein the first reflector comprises first and second inclined surfaces arranged adjacent to each other at opposite sides of an inflection point.

14. The illumination unit according to claim 13, wherein the first inclined surface is arranged adjacent to the second light source module, and the first inclined surface has a smaller radius of curvature than the second inclined surface.

15. An illumination unit comprising:
    a first reflector;
    a second reflector arranged at either side of the first reflector;
    at least one light source module arranged between the first reflector and the second reflector;
    a cover member for covering the second reflector; and an optical member arranged between the cover member and the second reflector while facing the first reflector,
wherein the optical member comprises
a central region, and
a peripheral region surrounding the central region, and
wherein the peripheral region of the optical member has a greater weight than a weight of the central region of the optical member.

16. The illumination unit according to claim 15, wherein the weight of the peripheral region of the optical member is about 0.1 to 10 times greater than the weight of the central region of the optical member.

17. The illumination unit according to claim 15, wherein the optical member comprises a first projection member arranged at a side of the peripheral region facing the cover member, and a second projection member arranged at a side of the peripheral region facing the second reflector.

18. The illumination unit according to claim 17, wherein the first projection member is arranged adjacent to the central region of the optical member, and the second projection member is arranged adjacent to an end of the optical member.

19. The illumination unit according to claim 17, wherein the first and second projection members are misaligned with each other.

20. A display apparatus comprising:
a display panel; and
an illumination unit for irradiating light onto the display panel,
wherein the illumination unit comprises
a first reflector,
a second reflector arranged at either side of the first reflector,
at least one light source module arranged between the first reflector and the second reflector,
a cover member for covering the second reflector,
an optical member arranged between the cover member and the second reflector while facing the first reflector,
a first projection member interposed between the optical member and the cover member, and
a second projection member interposed between the optical member and the second reflector,
wherein a distance from the cover member to one side surface of the first projection member is longer than a distance from the cover member to one side surface of the second projection member.

* * * * *